United States Patent [19]

Speer et al.

[11] Patent Number: 5,019,169
[45] Date of Patent: May 28, 1991

[54] GRAY-BLACK ENCAPSULATED PIGMENTS AND METHOD FOR THEIR PREPARATION

[75] Inventors: Dietrich Speer, Hanau; Akos Kiss, Wasserlos; Peter Kleinschmit, Hanau, Fed. Rep. of Germany

[73] Assignee: Degussa Aktiengesellschaft, Frankfurt, Fed. Rep. of Germany

[21] Appl. No.: 487,294

[22] Filed: Mar. 2, 1990

[30] Foreign Application Priority Data

Mar. 3, 1989 [DE] Fed. Rep. of Germany ....... 3906819

[51] Int. Cl.$^5$ ................................................ C09C 1/62
[52] U.S. Cl. .................................... 106/438; 106/439; 106/450; 427/215
[58] Field of Search ............... 106/438, 450, 439, 456, 106/457; 427/215; 241/23

[56] References Cited

U.S. PATENT DOCUMENTS

| | | | |
|---|---|---|---|
| 3,488,204 | 1/1970 | Jordan et al. | 106/450 |
| 3,847,639 | 11/1974 | Broll | 106/420 |
| 4,482,390 | 11/1984 | Airey et al. | 106/450 |
| 4,788,080 | 11/1988 | Hojo et al. | 427/215 |
| 4,874,433 | 10/1989 | Kiss et al. | 106/450 |

FOREIGN PATENT DOCUMENTS 2312535 5/1972 Fed. Rep. of Germany.

Primary Examiner—Mark L. Bell
Assistant Examiner—Deborah Jones
Attorney, Agent, or Firm—Beveridge, DeGrandi & Weilacher

[57] ABSTRACT

Gray-black pigments are prepared by encapsulating iron titanates of formula $FeTiO_3$ in zirconium silicate crystals. Manufacture is by calcining a mixture of zirconium oxide having a particle size distribution of 6 to 10 $\mu$m and a specific surface area of 2 to 5.2 m$^2$/g, silicon dioxide and iron and titanium oxides or Fe and Ti compounds forming oxides in the presence of mineralizers under oxidizing conditions at 800 to 1300° C. Finely divided $FeTiO_3$ can also be used.

7 Claims, No Drawings

GRAY-BLACK ENCAPSULATED PIGMENTS AND METHOD FOR THEIR PREPARATION

INTRODUCTION AND BACKGROUND

The present invention relates to gray-black encapsulated pigments based on zirconium silicate as the encasing substance for encapsulating pigmenting or colorant compounds in the form of a discrete phase. Further, the present invention relates to a method for making these encapsulated pigments.

Encapsulated pigments also known as inclusion pigments in general are known in the art, as for example from the German Patent 23 12 535. They consist of transparent crystals of glaze-stable substances such as zirconium silicate, zirconium oxide or tin oxide which encase or encapsulate inorganic anhydrous pigmenting or colorant compounds in a discrete phase. Pigmenting compounds are illustrated by Thenard's blue, titanium yellow and especially cadmium yellow and cadmium red. Moreover, zirconium iron rose with $Fe_2O_3$ encased in a zirconium silicate casing also is known. The manufacture of these encapsulated pigments is carried out by methods well known in the art, e.g. heating the casing substances, or its initial precursors and the pigmenting substances to be encased, or their initial precursors, in the presence of mineralizers, to temperatures up to 1200° C. However, it has been found in the art that this procedure does not allow encapsulation of all conceivable pigmenting compounds into the casing substances with significant yields.

The palette range of gray-black colors is not very wide. Essentially such pigments are obtained from iron oxides and chromium oxides, optionally in combination with other oxides such as manganese oxide, copper oxide, nickel oxide or cobalt oxide. Up to this time, no gray-black encapsulated pigments have been known.

SUMMARY OF THE INVENTION

Accordingly, it is an object of the present invention to provide gray-black encapsulated pigments of transparent zirconium-silicate crystals, which encase the pigmenting/colorant compounds as a discrete phase. A further object of the invention is to provide a method for making these encapsulated pigments and to achieve relatively high yields thereof.

In attaining the above and other objects, a feature of the invention resides in encapsulating crystalline iron titanates of the $FeTiO_3$ composition as the pigment/colorant component.

These encapsulated pigments provided by the present invention exhibit a gray-black color. Different color nuances or shades can be the result of different amounts of the encapsulated colored crystallites as well as varying particle form and particle size of these crystallites.

The gray-black encapsulated pigments are prepared by calcining a previously ground mixture of zirconium oxide, silicon oxide and precursor compounds of the pigmenting compounds to be encased in the presence of mineralizers and at temperatures of 800° to 1300° C. In carrying out the method, zirconium oxide is emphasized with a particle size distribution (D50 values) of preferably 6 to 10 μm and with a specific surface area of 2 to 5.2 m²/g. As the starting materials for the pigmenting compound to be encased iron oxides and titanium oxides or iron compounds and titanium compounds which form oxides at elevated temperatures under reducing conditions can be employed. The compacted mixture is then calcined under reducing conditions from 0.5 to 8 hours in conventional furnaces.

The iron and titanium compounds used are either the oxides such as FeO, $Fe_2O_3$, $Fe_3O_4$ and $TiO_2$, or compounds that at higher temperatures and under reducing conditions are capable of forming oxides, for instance titanyl compounds. In principle the iron titanate of the formula $FeTiO_3$ also can be used directly as the pigment/colorant provided such products be available in the required degree of finenesses. The mineralizers are well known in the art and ordinarily are alkali metal or alkaline earth metal halides, preferably alkali metal fluorides or alkaline earth metal fluorides and alkali metal silicofluorides.

In this manner gray-black encapsulated pigments containing $FeTiO_3$ are obtained. The yields of useful pigments are 90% and higher. Preferably the mean particle size of the encapsulated pigments is in the range of 5 to 10 μm. The pigmenting compound $FeTiO_3$ that is completely encased by the $ZrSiO_4$ crystal casing exhibit a substantially smaller particle size; i.e. as a rule less than 1 μm.

Preferably fine-particulate iron oxides ($Fe_2O_3$) with D50 values of 0.2 to 0.7-m and surfaces of 13 to 24 m²/g (determined as for $ZrO_2$ in geometric manner from the particle distribution) are used for purposes of the invention. The Ti compound preferably is titanium dioxide, in particular as fine-particulate titanium dioxide as possible, most preferably having a particle size less than 1 μm. In the event pyrogenic titanium oxides are used, then mixtures of anatase and rutile are especially advantageous. On account of its method of manufacture, pyrogenic $TiO_2$ frequently exhibits a primary particle size of approximately 20 to 30 nm.

Zirconium oxide and silicon dioxide are used in essentially equivalent amounts. The mixture to be calcined is ground before calcining, for instance in a ball mill or another intensive grinder or mill apparatus. Calcination can be carried out in conventional furnaces such as chamber, tunnel or piston furnaces (furnace for getting the product to be calcined heated up within the shortest time). Preferably the heating rate shall be 800° to 1000° C./hour, however, the heating rate also may be outside those limits. When calcining in the especially preferred range of 1000° to 1200° C./hour a calcination time of 1 to 2 hours is generally adequate.

The new gray-black encapsulated pigments are suitable for coloring glazes. In contrast, non-encapsulated iron titanates are not glaze-stable, that is, they dissolve during vitrification.

DETAILED EMBODIMENTS OF THE INVENTION

The examples which follow are illustrative of the invention:

EXAMPLE 1

A mixture of 25 g zirconium oxide (D50 value=7.6 μm; surface area=3.1 m²/g), 13.5 g silicon dioxide; 3.5 g potassium chloride; 2.5 g magnesium fluoride; 1.5 g sodium hexafluorosilicate; 5 g iron (III) oxide and 2.5 g pyrogenic titanium dioxide with about 30% by weight rutile content is ground for 30 minutes and then heated at the rate of 1000° C./hour and following covering with sugar is heated to 1100° C. and at that temperature is then calcined for 1 hour. A gray-black product is obtained, consisting of FeTiO$_3$ crystals encapsulated in zirconium silicate. The yield is 95%.

EXAMPLE 2

A mixture such as described in Example 1 with the zirconium oxide exhibiting a D50 value of 9.3 μm and a specific surface area of 2.2 m$^2$/g, is heated at a rate of 900° C./hour to 1200° C. and calcined for 1 hour. Again a gray-black product is obtained. The yield is 92%.

EXAMPLE 3

A product similar to that of Example 1 is obtained when using zirconium oxide with a D50 value of 6.6 μm and a specific surface area of 5.2 m$^2$/g.

Further variations and modifications of the foregoing will become apparent to those skilled in the art and are intended to be encompassed by the claims appended hereto.

We claim:

1. A gray-black encapsulated pigment, consisting essentially of transparent crystals of zirconium silicate encasing as a discrete phase, a pigmented compound which is crystalline iron titanate having the composition FeTiO$_3$.

2. The gray-black encapsulated pigment according to claim 1 having a mean particle size in the range of 5 to 10 microns.

3. A method for manufacturing gray-black encapsulated pigments comprising providing a ground mixture of zirconium oxide, silicon oxide and precursor compounds of the pigmenting compound to be encapsulated, as well as at least one mineralizer, the zirconium oxide having a particle size distribution (D50 value) of 6 to 10 μm and a specific surface area of 2 to 5.2 m$^2$/g, the precursor compounds of the pigmenting compound to be encapsulated are iron and titanium oxides or iron and titanium compounds capable of forming oxides, or immediately FeTiO$_3$, calcining said mixture at 800° to 1300° C. under reducing conditions for 0.5 to 8 hours.

4. The method according to claim 2, wherein there is used fine-particulate iron oxide (Fe$_2$O$_3$) with a D50 value between 0.2 and 0.7 m and with a specific surface area between 13 and 24 m$^2$/g.

5. The method according to claim 3, wherein pyrogenic titanium oxide of the anatase and rutile structure is used.

6. The method according to claim 3, wherein the mixture is heated at a rate of 800° to 1000° C./hour to the calcining temperature.

7. The method according to claim 3, wherein the calcining is carried out under such conditions as to produce a yield of at least 90% of the encapsulated pigment.

* * * * *